INVENTOR:
ALBIN L. LEE

United States Patent Office 3,352,165
Patented Nov. 14, 1967

3,352,165
TWO-SPEED POWER-TAKE-OFF DRIVE
Albin L. Lee, Racine, Wis., assignor to J. I. Case Company, Racine, Wis., a corporation of Wisconsin
Filed Oct. 4, 1965, Ser. No. 492,403
3 Claims. (Cl. 74—15.4)

ABSTRACT OF THE DISCLOSURE

A power-take-off shaft is releasably disposed in a driving sleeve so that the shaft is splined with the sleeve but can be reversed end-for-end in the sleeve. A clutch element is disposed between the sleeve and driving gears which include two gears rotatable at different speeds. The clutch element is shiftable between the two gears for rotating the sleeve at two different speeds. The power-take-off shaft is longer on one end, from its centrally located spline, than it is on its other end, and the longer end engages the shiftable clutch element for effecting the two different speeds of rotation of the sleeve and thus provide the different speed rotation for the power-take-off shaft.

---

This invention relates to a two-speed power-take-off drive for a tractor.

It is common practice to provide a two-speed power-take-off drive for a tractor wherein two different implements can be driven at the respective two different speeds. In accomplishing this, there has been the employment of either two power-take-off shafts which alternately mount on the tractor gear box or the like, or there has been a single shaft which mounts on the gear box in two different locations. In the latter instance, the single shaft is alternately mounted in two different drive sleeves or the like, and the shaft is also sometimes turned end-to-end to have different ends of the shaft project from the gear box in accordance with whichever sleeve the shaft is inserted into.

Further, the shaft or shafts, whichever there may be, one or two, are provided with different splining on opposite ends so that the user will know when a certain spline is extending from the gear box then a certain speed is attainable with the power-take-off shaft. For instance, there may be the well known six-tooth spline on one end of the shaft for the low speed of say 540 r.p.m., and there may be the twenty-one-tooth spline on the other end of the shaft for a speed of 1000 r.p.m., for instance. Therefore, whichever end of the shaft is extending from the gear box and its respective spline is exposed, it will be obvious as to what speed will be produced at the extending end of that power-take-off shaft.

It is a general object of this invention to provide a two-speed power-take-off drive which is an improvement over those heretofore known in that it is simplified in its construction, has fewer parts in that only one shaft and one drive sleeve is required, is easy to use and maintain as well as manufacture, and which of course indicates and provides the two speeds desired.

Other objects of this invention include the provision of a two-speed power-take-off drive which is sturdy and reliable in its operation, can be easily converted between the two-speed positions without requiring elaborate tools or skillful alterations, and which provides a common axis for the location of the single shaft for both the speeds and thus the implements can be attached on the common axis without the need for any adjustments or alterations which are required where different axes are utilized for the different speeds.

Other objects and advantages become apparent upon reading the following disclosure in light of the accompanying drawings, wherein.

A gear set generally designated 10 is shown fragmentarily and within a housing 11 which is also fragmentarily shown. These parts are those which commonly are utilized in a gear box for providing the transmission between the prime mover of a tractor and the driving shafts of the tractor, such as the power-take-off shafts. Thus it will be understood that the gear box or housing 11 would be incorporated in a tractor to drive a shaft 12, extending forwardly of the tractor, and a power-take-off shaft 13, which extends usually rearwardly of the tractor.

Figure 1:
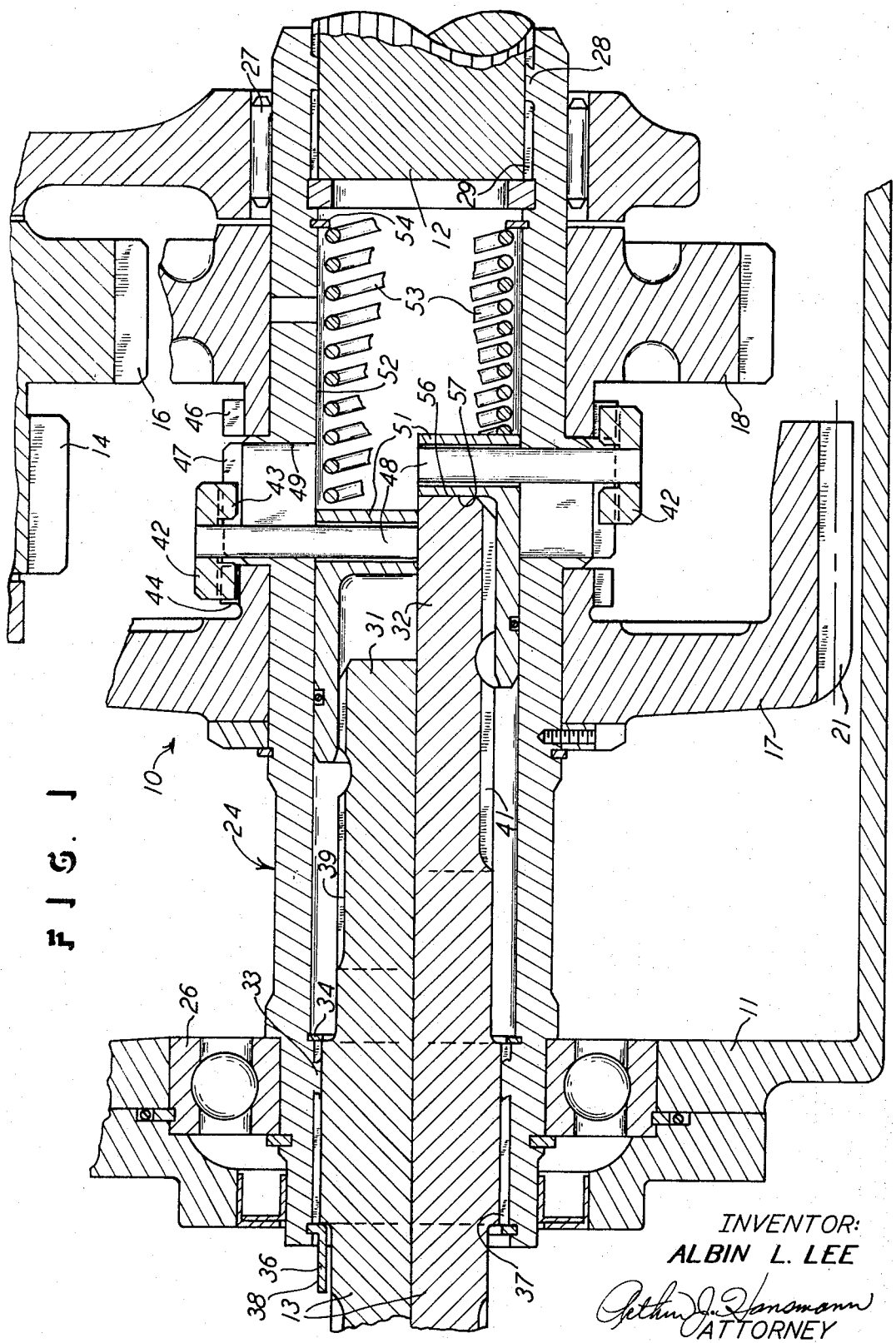
FIG. 1 is a longitudinal sectional view of a preferred embodiment of this invention with parts thereof broken away and with parts thereof shown in two different positions on opposite sides of the axis of the power-take-off shaft.

A driving gear cluster consisting of gears 14 and 16, which are only fragmentarily shown in FIG. 1, are included in the gear set and they respectively mesh with gears 17 and 18. The particular location of the four gears mentioned is indicated by the same reference numerals applied to the circles in FIG. 2, and these circles represent the pitch diameter of these gears. Thus it will be understood that the gears 14 and 16 are mounted together on a common shaft 19, and these gears are in constant mesh with the gears 17 and 18, respectively. The gear 17 has teeth 21 which of course are in mesh with the teeth on the gear 14. In order to show the gears 14 and 16 in FIG. 1, the upper ends of the gears 17 and 18 have been broken away, but it would of course be understood that the four gears are in mesh as described and as indicated in FIG. 2.

Figure 2:
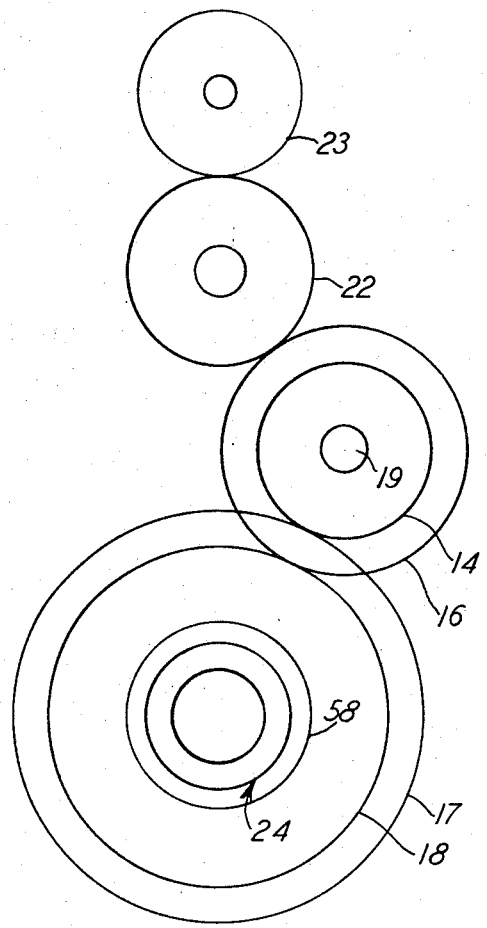
FIG. 2 is a diagrammatic view of the pitch diameters of the gear set and of other parts included in the embodiment.

FIG. 2 also shows that two other gears are included in the set, and these gears are indicated by the pitch diameters designated 22 and 23, with the gear having the pitch diameter 22 being in constant mesh with the gear 16, as shown.

A sleeve generally designated 24 is rotatably mounted in the box 11 by means of bearings 26 and 27 interposed between the housing 11 and the sleeve 24 in any conventional and well-known manner. The sleeve is of course driven by the gears mentioned, and by other means yet to be described, and the sleeve includes a spline 28 which engages a spline 29 on the forwardly extending shaft 12 to transmit the rotation of the gears to the shaft 12.

The important feature of the construction is the arrangement which provides for the shaft 13 to be driven at two different speeds so that the implements (not shown) can be powered at the desired speeds that they require. FIG. 1 shows the power-take-off shaft 13 in a split display for completeness and conveninve of drawing. That is, the shaft 13 is both sectioned and split along its axis and is shown with one end 31 inserted in the sleeve 24 in the upper half of the showing and with its opposite end 32 shown inserted in the sleeve 24 in the lower half of the showing of the shaft 13. Thus both ends 31 and 32 of the shaft 13 are shown in FIG. 1. Of course the shaft 13 is only fragmentarily shown toward the left in FIG. 1 and it would be understood that the end toward the left would extend further beyond the gear box 11 in a completed manner and to a length which may be convenient.

Figure 3:
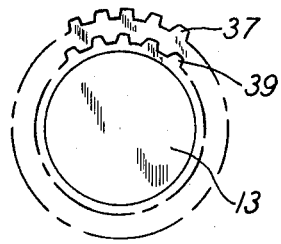
FIG. 3 is an end elevational view of the power-take-off shaft and with the view taken from the so-called high speed end of the shaft.
Figure 4:
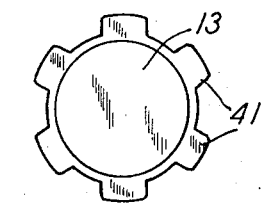
FIG. 4 is an end elevational view of the power-take-off shaft and with the view taken from the so-called low speed end of the shaft.

It is significant to note that the sleeve 24 has a spline designated 33, and this extends between the snap ring 34 and the removable snap ring 36 and around the interior of the sleeve 24 in the length defined between these two snap rings. Similarly, the power-take-off shaft 13 has a spline designated 37, and the shaft spline 37 is arranged and located to be in driving relation with the sleeve spline 33 so that the sleeve 24 drivingly rotates the shaft 13 at all times. It will then again be noted that the shaft ends 31 and 32 are of a different length from the location of the shaft spline 37, and thus the end 32 extends further into the sleeve 24, as shown. Of course it will further be understood that the snap ring or retainer 36 has a tang 38 which permits removal of the ring 36 from the sleeve 24 so that the shaft 13 can be removed from the sleeve 24 and turned end-for-end and reinserted, as desired. Of course the snap ring 36 would then be reinserted to secure the shaft 13 within the sleeve 24. The shaft end 31 has what may be termed the high speed spline generally designated 39 and which may consist of twenty-one teeth, as indicated in FIG 3. The shaft end 32 has what may be designated a low speed spline generally designated 41, and which is shown in FIG. 4 to consist of the six teeth. Of course when the ends 31 and 32 are projecting out of the gear box 11, that is to the left in FIG. 1, then the operator will know what speed the shaft 13 will rotate at when the device is operating since he will see the different splines 39 and 41.

A clutch element 42 is included in the gear set or train and is axially shiftable between the gears 17 and 18 so that internal clutch teeth 43 on the clutch element 42 alternately mesh with clutch teeth 44 and 46 which are provided on the gears 17 and 18 respectively. The clutch element 42 is also in mesh with clutch teeth 47 on the sleeve 24, as shown. A pin 48 is also shown in its two different positions in the upper half and the lower half of the pin 48, and the pin assumes the two different positions by sliding in a slot 49 in the sleeve 24. Of course when the pin is to the left in the sleeve slot 49, as shown on the upper half in FIG. 1, then the clutch element 42 is driven by the gear 17, and this is the low speed gear or drive. Conversely, when the pin 48 is to the right of the sleeve slot 49, as shown on the lower half in FIG. 1, then the clutch element 42 is in mesh with the gear 18, and this is the high speed drive or gear.

In this manner, the sleeve 24 is driven at the desired two different speeds effected by the shifting of the clutch element 42, as described. A cup-shaped member 51 is slidable in the bore 52 of the sleeve 24, and the member 51 receives the pin 48 to actually induce the displacement of the pin 48. A compression coil spring 53 is also disposed within the sleeve bore 52 to have one end of the spring bear against the adjacent wall of the member 51, and the other end of the spring is supported by a snap ring 54. Thus the spring 53 yieldingly urges the member 51 axially to the left in FIG. 1, that is to the low speed position.

It will of course also now be noted that the shaft 13 extends into the sleeve 24 in abutment with the member 51 when the shaft end 32 is inserted into the sleeve 24. This displaces the member 51 to the right hand position shown in FIG. 1, and this is the high speed position. The shaft 13 then of course rotates at the higher speed which is automatically accomplished by inserting the shaft end 32 into the sleeve 24 and securing the shaft 13 by the snap ring 36, or by other means which would locate the shaft spline 37 in the axial position shown. That is to say, the end wall 56 of the shaft 13 abuts the wall 57 of the cup-shaped member 51 to displace the latter to the right as shown in the lower half in FIG. 1.

FIG. 2 shows a pitch diameter designated 58 and representing the pitch diameter of the gear 42 and that of teeth 44, 46, and 47. These of course are all complete gears or teeth disposed in a circle as indicated by the pitch diameter line 58.

While a specific embodiment of this invention has been shown and described, it should be obvious that certain changes could be made in the embodiment and the invention should therefore be determined only by the scope of the appended claims.

What is claimed is:

1. A two-speed power-take-off drive for a tractor for selectively drivingly coupling to either one of two different speed implements driven by the tractor, comprising a set of gears including two different gears relatively rotatable within said set at two different speeds and including a clutch element shiftable between said two different gears for alternate meshing with said two different gears and correspondingly be rotatable at the two different speeds, a sleeve mounted on the axis of said clutch element and being alternately rotatably driven by said clutch element at said two different speeds, a power-take-off shaft releasably splined in said sleeve for rotation therewith and extending therefrom and being removable therefrom for end-to-end reversal in said sleeve and with one end of said shaft extending from the spline and into said sleeve a distance farther than the extent of the other end of said shaft into said sleeve and with the difference in the extent being at least the amount said clutch element shifts, and abutment means operative between said one end of said shaft and said clutch element such that when said shaft is splined to said sleeve said shaft shifts said clutch element and rotates at a speed in accordance with whichever end of said shaft is inserted into said sleeve.

2. A two-speed power-take-off drive for a tractor, comprising a set of gears including two gears relatively rotatable within said set at two different speeds, a clutch element axially shiftable between said two gears and including clutch teeth for alternate meshing with said two gears, a spring operative on said clutch element for yieldingly urging the latter in one axial direction, a sleeve mounted on the axis of said clutch element and being in rotatable relation therewith to be rotatably driven by said clutch element alternately at said two different speeds, and a power-take-off shaft including splines on both ends on an intermediate portion and with the latter said spline being offset from the central length of said shaft and being releasably splined to said sleeve for rotation therewith, said shaft extending from said sleeve and being removable therefrom for end-to-end reversal in said sleeve and with one end of said shaft extending from said spline on said intermediate portion and into said sleeve a distance farther than the extent of the other end of said shaft into said sleeve and with the difference in the extent being at least the amount said clutch element shifts, and means engageable between said one end of said shaft and said clutch element such that said shaft shifts said clutch element in the axial direction opposite from the shifting by said spring so that said shaft rotates at a speed determined by whichever end of said shaft is inserted into said sleeve.

3. A two-speed power-take-off drive for a tractor, comprising a rotatably mounted hollow sleeve including an internal spline and an external gear, a set of gears mounted on said sleeve and including two gears relatively rotatable within said set at two different speeds and including a clutch element axially shiftable on said external gears and between said two gears for alternate meshing with said two gears and alternately transmitting the rotation of said two gears to said sleeve, a connector extending from said clutch element and into said hollow sleeve, a spring operative on said connector for yieldingly urging said clutch element in one axial direction, and a power-take-off shaft partly disposed within said sleeve and rotatable therewith and including splines on both ends and on an intermediate portion and having a longer end defined by the spline on said intermediate portion being offset from the central length of said shaft, said shaft being removable from said sleeve for end-to-end reversal in said sleeve and with said longer end of said shaft extending from the spline on said intermediate portion a distance farther than the extent of the shorter end of said shaft and with the difference in the extent being at least the amount said clutch element shifts, and said longer end of said shaft being abutable with said connector when said longer end is in said sleeve so that said shaft shifts said clutch element in the axial direction opposite from the shifting by said spring and with said shorter end being clear of a position of abutment with said connector when said shorter end is in said sleeve so that said sleeve rotates at a speed determined by whichever end of said shaft is inserted into said sleeve.

References Cited

UNITED STATES PATENTS

| | | | |
|---|---|---|---|
| 2,968,188 | 1/1961 | Du Shane et al. | 74—375 |
| 3,261,222 | 7/1966 | Fresmann et al. | 74—375 |
| 3,279,275 | 10/1966 | Christie | 74—375 |

DONLEY J. STOCKING, *Primary Examiner.*

ROBERT M. WALKER, *Examiner.*

L. H. GERIN, *Assistant Examiner.*